F. WALLER.
COOKING UTENSIL.
APPLICATION FILED MAR. 16, 1912.
1,056,237.
Patented Mar. 18, 1913.
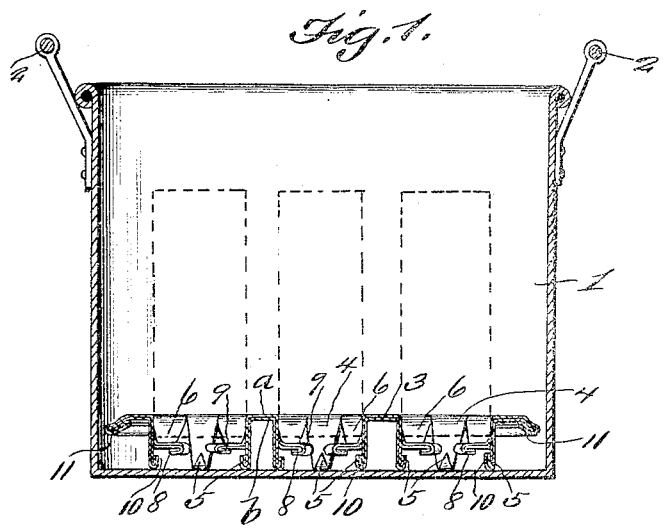
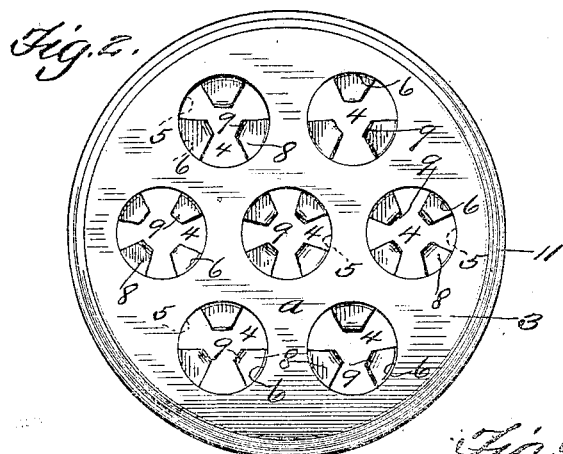
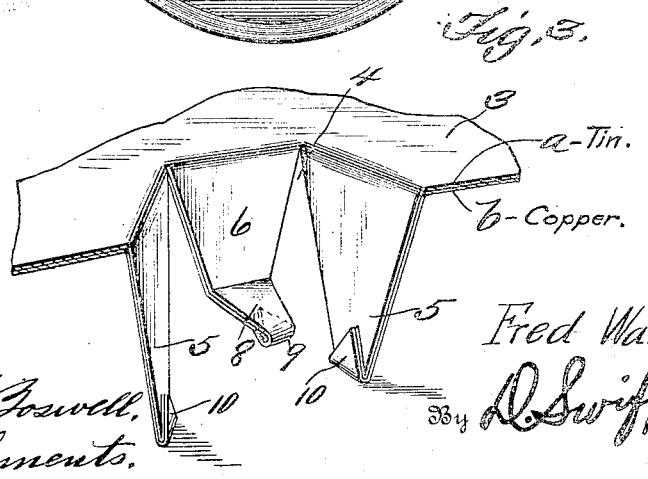
Witnesses
Francis V. Boswell
C. E. Clements
Inventor
Fred Waller,
By D. Swift & Co.
Attorneys

UNITED STATES PATENT OFFICE.

FRED WALLER, OF LYONS, ILLINOIS.

COOKING UTENSIL.

1,056,237.  Specification of Letters Patent.  Patented Mar. 18, 1913.

Application filed March 16, 1912. Serial No. 684,259.

*To all whom it may concern:*

Be it known that I, FRED WALLER, a citizen of the United States, residing at Lyons, in the county of Cook and State of Illinois, have invented a new and useful Cooking Utensil; and I do hereby declare the following to be a full, clear, and exact description of the invention, such as will enable others skilled in the art to which it appertains to make and use the same.

This invention relates to a new and useful preserving kettle.

It is the aim of the invention to provide a device of this nature, in which novel and essential features of construction are involved.

The principal feature of the construction is the provision of a false bottom having a plurality of openings to receive preserving jars, in which the fruit and other ingredient are placed, so as to support them erect. The bottom is provided with lugs having portions projecting inwardly of the opening, to support the jars above the bottom of the preserving kettle or receptacle, and other lugs or legs for supporting the false bottom spaced apart above the bottom of the receptacle.

The invention comprises further features and combination of parts, as hereinafter set forth, as shown in the drawings and claimed.

In the drawings:—Figure 1 is a central sectional view through the preserving kettle, showing the improved false bottom as arranged in position. Fig. 2 is a view in perspective of the false bottom removed. Fig. 3 is a detail view.

Referring to the drawings 1 designates the preserving kettle, which may be of the usual construction, and having handles 2. Arranged in the receptacle is a false bottom 3, which is constructed of an area of sheet copper $b$ forming an under surface and an area of sheet tin $a$ forming an upper surface. A plurality of openings is formed in the false bottom. Each opening 4 has a series of legs projecting from the periphery. Arranged between the legs 5 alternately and also projecting from the periphery of the opening is a series of lugs 6. The legs 5 project downwardly from the false bottom, to engage the bottom of the receptacle or preserving kettle, in order to support the false bottom spaced apart above the bottom of the receptacle. The lugs 6 project downwardly and inwardly, so as to form supports for the preserving jars. The supports 8 have their extremities bent upon themselves, as shown at 9, so as to strengthen the support and prevent them from becoming worn to any great extent. The lower extremities of the legs are also bent on themselves, as shown at 10. The periphery of the false bottom is bent upon itself to form a bead 11, which is turned downwardly as shown, so that as the false bottom is removed from the preserving receptacle, the water will thoroughly drain from the upper surface thereof. The forming of the bead 11 holds the upper and under areas of sheet tin and copper together.

In preserving, the fruit and other materials are placed in the jars. Then one jar is placed in each of the openings of the false bottom, so as to be supported by the lugs. The preserving kettle with the jars supported by the false bottom, with water surrounding the jars is placed over the fire. The fruit is thoroughly cooked, by the boiling water.

The invention having been set forth, what is claimed as new and useful is:—

A false bottom constructed with a sheet copper under surface and a sheet tin upper surface, the peripheries of which are bent downwardly and outwardly and upon themselves to hold the two areas of metal together, said false bottom having a plurality of openings, each to receive a fruit jar, each opening having its periphery provided with alternately arranged legs and lugs, the legs being directed downwardly to support the false bottom, while the lugs are extended downwardly and inwardly of the openings to support the preserving jars, the extremities of the legs and the lugs being bent upon themselves, to obviate wear and the like.

In testimony whereof I have signed my name to this specification in the presence of two subscribing witnesses.

FRED WALLER.

Witnesses:
 GIDEON S. THOMPSON,
 JOHN M. QUINLAN.